United States Patent Office 3,352,826
Patented Nov. 14, 1967

3,352,826
INCREASED HEAT DISTORTION
ETHOXYLINE RESINS
Wayne F. McWhorter and John E. Kuhn, Louisville, Ky., and Harold C. Klassen, New Albany, Ind., assignors, by mesne assignments, to Celanese Coatings Company, a corporation of Delaware
No Drawing. Filed June 23, 1958, Ser. No. 744,004
5 Claims. (Cl. 260—47)

This invention relates to a method of curing ethoxyline resins to form useful resinous substances.

Ethoxyline resins are glycidyl polyethers obtained, for example, by reacting a polyhydric alcohol or phenol with epichlorhydrin in an alkaline medium. Ethoxyline resins have heretofore been cured to hard products with an acid or basic acting hardening agent such as polycarboxylic acid, anhydride, or polyamine. While such curing or hardening agents effect excellent cures of glycidyl polyethers, the cured resins are not entirely satisfactory for uses requiring a resin-catalyst composition having a long room-temperature pot life.

Since most amines and anhydrides, in combination with ethoxyline resins, are not stable at room temperature, considerable effort has been expended to develop a curing agent having a long or indefinite pot life. The $BF_3$ complexes are particularly useful in this connection because they prolong pot life considerably. However, when $BF_3$ complexes are used as curing agents, cured resins having inconsistent heat distortion temperatures result. Heat distortion is the temperature at which a cured resin of definite dimensions deforms 10 mils under a definite fiber stress. It is a method of determining the high temperature strength or thermal stability of a resin. When cured with $BF_3$ complexes, ethoxyline resins of uniform thermal stability cannot be made—consistent heat distortion temperatures are not obtainable. Thus, when several samples of an ethoxyline resin having an epoxide gram equivalent of 190 are cured under the same conditions with a $BF_3$-amine complex, heat distortion temperatures of resulting cured products range from 129° C. to 160° C. and also vary with post-curing conditions.

Additives are not known which will increase heat distortion temperatures of cured ethoxyline resins, and in fact it is generally expected that when a liquid is added to an ethoxyline resin heat distortion temperatures of cures will be lower as is the case when dibutyl phthalate is added.

However, in accordance with this invention a liquid additive is provided which improves heat distortion temperatures of ethoxyline resins cured with $BF_3$ complexes.

In the practice of this invention if from one to three percent of triphenyl phosphite is used in combination with the the $BF_3$ complex heat distortion temperatures of cured $BF_3$ complex-ethoxyline resin compositions are increased, rendering them more applicable to high temperature uses.

In addition by the practice of this invention cured $BF_3$ complex-ethoxyline resin compositions are obtained having heat distortion temperatures which fall in a narrow temperature range. In accordance with this invention when from about 1 to 3 percent of a triaryl phosphite such as triphenyl phosphite is used in combination with the $BF_3$ complex in the curing of ethoxyline resins, predictable heat distortion temperatures result. In the case of an ethoxyline resin having an epoxide gram equivalent of 190, heat distortion temperatures of resulting cured compositions lie in the range of 160° C. to 170° C. rather than varying from 129° C. to 160° C.

Of the triaryl phosphites which co-act in some way in the $BF_3$ complex-resin system to improve heat distortion temperatures, triphenyl phosphite is preferred. By triaryl phosphite is intended those aromatic phosphites free of reactive groups. Thus, tri-(aminophenyl)phosphite and the like are excluded. Suitable triaryl phosphites are diphenyl 2,4-diethylphenyl phosphite, phenyl ethylphenyl 2,4-diethylphenyl phosphite, bis-(2,4-dimethylphenyl) phenyl phosphite, methylphenyl ethylphenyl 2,3-diethylphenyl phosphite, bis-(para-ethylphenyl) naphthyl phosphite, and the like. In general the aryl substituents forming the phosphites are phenyl or alkyl-substituted phenyl groups.

In the preparation of the cured compositions in accordance with this invention, it is desirable to have the ethoxyline resin in a mobile liquid condition when the triphenyl phosphite, or other triaryl phosphites are added. In order to facilitate mixing with those ethoxyline resins which are too viscous on heating for ready mixing, such as those having epoxide equivalencies of 300 to 500, thinners such as butyl glycidyl ether are added in order to provide fluidity. The ethoxyline resin-$BF_3$ complex-triphenyl phosphite composition is then heated to effect a cure, curing being carried out over a wide range of temperatures, generally in the range of 40° C. to 200° C. Excellent cures are obtained in the range of 150° C. to 200° C. Temperatures over 200° C. are generally not desirable but may be employed if necessary.

The $BF_3$ complexes employed in combination with ethoxyline resins and triaryl phosphites are complexes of boron trifluoride and phenols, ethers, or organic nitrogen compounds such as amines and amides which do not have a negative group attached to the nitrogen atom. The phenolic compounds may be mono or poly-nuclear and mono or polyhydric, such as, for example, phenol, bisphenol, resorcinol, catachol, 2,2-bis(4-hydroxyphenyl) butane, and the like. The amine compounds can be, for example, a primary, secondary, or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylene diamine, triethylene tetramine, tetraethylene pentamine, amino-ethylethanolamine, etc.; aromatic amines, such as o-phenylenediamine, m-phenylenediamine, p-phenylenediamine, o-toluidine, m-toluidine, p-toluidine, benzylamine, methylaniline, diphenylamine, triphenylamine, etc., pyridine, compounds having condensed pyridine rings and their homologs and other derivatives, such as, for example, alpha-picoline, beta-picoline, gamma-picoline, the lutidines such as 2,6-lutidine, the collidines, 2-ethanolpyridine, 4-ethanolpyridine, 2-hexylpyridine, 2-propanolpyridine, 4-propanolpyridine, 2-vinylpyridine, quinoline, isoquinoline, quinaldine, iepidine, etc., aminopyridines, and homologs thereof, for example, 2-aminopyridine, 2 - amino-4-methyl-pyridine, 2-amino-3-methylpyridine, etc.; cycloalkylamine, such as, for example, cyclohexylamine, dicyclohexylamine, piperidine, etc.

The ethers are exemplified by dimethyl ether, diethyl, ether, methyl ethyl ether, butyl ether, isopropyl butyl ether, methyl amyl ether, methyl hexyl ether, dimethyl ether of ethylene glycol, phenyl methyl ether, benzyl ethyl ether, ethyl Cellosolve and dibenzyl ether. The amides are exemplified by acetamide, dimethyl formamide, propionamide, dimethyl propionamide, valeramide, ethyl valeramide, diacetamide, benzamide and the like. The $BF_3$ complexes thus are addition products of boron trifluoride and an amine, amide, ether, or phenol. Methods of preparing the $BF_3$ complexes are known. The $BF_3$ amine complexes for example, are prepared by passing $BF_3$ gas over or into the solution containing the amine.

Ethoxyline resins are generally known and need not be described at length. An ethoxyline resin, or a polyepoxide as it is often called, is a complex polyether derivative of a polyhydric organic compound, said derivative containing 1,2 - epoxy groups. The ethoxyline compounds are resinous reaction products of epihalohydrins and alcohols or phenols having at least two alcoholic or phenolic hydroxyl groups. These products are glycidyl polyethers of polyhydric phenols and polyhydric alcohols, and they are described in such patents as U.S. 2,615,007, 2,615,008, 2,582,985, 2,485,160 and 2,581,464. It is preferred to use normally liquid ethoxyline resins, for example, those meltingg below 30° C. However it is understood that solid ethoxyline resins can be melted or dissolved in a solvent and thus used. The resin can also be dispersed in an aqueous medium if desired. Accordingly, any ethoxyline resin can be used in accordance with the invention. In general, however, ethoxyline resins having weights per epoxide below 1000 will be used since higher molecular weight ethoxylines will be less efficient cross-linking agents. By epoxide gram equivalent is meant the weight in grams per epoxide (i.e. oxirane) group, and it is determined from the 1,2-epoxy equivalency.

In the preparation of the cured compositions the $BF_3$ complex and the polyepoxide are used in amounts in the range of 0.5 to 10 percent by weight $BF_3$ complex based on the resin. With respect to the triaryl phosphite, it has been found that between 1 and 3 percent by weight based on the resin yield cured compositions having desirable heat distortion temperatures. As illustrated in the examples, optimum heat distortion temperatures are obtained by the use of 2 percent triaryl phosphite based on the weight of the resin.

To illustrate the manner in which uniform heat distortion temperature compositions are prepared by the use of $BF_3$ complexes, the following examples are given. It is understood, however, that the examples are for the purpose of illustration and that the invention is not to be regarded as limited to any of the specific materials or conditions recited therein. Unless otherwise indicated, parts described in the examples are parts by weight.

In the examples, the ethoxyline resin used is prepared according to a procedure well known in the art by the condensation of ten mols of epichlorhydrin with one mol of bis-phenol in the presence of two mols of sodium hydroxide. This ethoxyline resin, with a weight per epoxide group of 190, will be designated as Ethoxyline Resin 190 in the examples to follow.

*Example 1*

In a suitable container, 1.0 part (1.0 weight percent of triphenyl phosphite is combined with 99.0 parts of Ethoxyline Resin 190 and is blended with stirring until a homogeneous mixture is obtained. The resinous mixture is heated to 150° F. at which time 3.0 parts of $BF_3$—monoethylamine are added to the mixture and stirring is continued until a clear solution results. The solution is placed in a desiccator which is evacuated to approximately 15 mm. Hg in order to remove any entrapped air from the composition. The resinous solution is then poured into a mold fashioned from two 8" x 12" aluminum plates separated by ⅛" aluminum gaskets which determine the cavity thickness and enclose three of the four sides of the mold. The filled mold is heated for one hour in a 150° F. oven followed by a sixteen hour bake at 302° F. From the casting obtained, 5" x ½" x ⅛" specimens are cut and according to the specifications of ASTM Test Method D 648–56 for Heat Distortion Temperature of Plastics, (recorded in Part 6 of ASTM Standards 1955) heat distortion temperatures are determined. The average of two determinations for this casting is 162° C.

*Example 2*

Other castings are prepared following the procedure of Example 1 but using different proportions of Ethoxyline Resin 190 and triphenyl phosphite. Heat distortion temperatures are determined on the castings as a basis of comparison and to ascertain the amount of triphenyl phosphite necessary to obtain optimum results. The table of this example enumerates the compositions used for the castings and their corresponding heat distortion temperatures.

| Ethoxyline Resin 190 Parts | Triphenyl Phosphite, Parts | $BF_3$-Ethylamine, Parts | Heat Distortion, Temp., ° C. |
|---|---|---|---|
| 100.0 | | 3.0 | 156 |
| 99.5 | 0.5 | 3.0 | 151 |
| *99.0 | 1.0 | 3.0 | 162 |
| 98.0 | 2.0 | 3.0 | 167 |
| 97.0 | 3.0 | 3.0 | 159 |
| 96.0 | 4.0 | 3.0 | 145 |

*Casting of Example 1.

The foregoing examples markedly illustrate the increase in heat distortion when a liquid ethoxyline resin is cured with a $BF_3$ complex in combination with one to three percent triphenyl phosphite. It has been found that when $BF_3$ complexes are used alone it is difficult to get the same heat distortion value every time. Results are not uniform. However through the use of triaryl phosphites with $BF_3$ complexes, cured products having non-erratic heat distortion temperatures are obtainable and the heat distortion temperatures do not vary as widely with curing conditions as is the case when the triaryl phosphite is not employed.

The systems described above are very useful in the preparation of pottings and castings designed to withstand high temperatures. The high heat distortion temperature compositions prepared according to the invention are particularly useful in military applications such as the rocket or missile field. The system is also useful in the preparation of laminates. Other applications as well as variations of this invention will occur to those skilled in the art. Such variations in applications as are obvious to one skilled in the art are deemed to be within the scope of the invention.

What is claimed is:

1. A composition of matter which when heat cured yields a product having a high heat distortion value comprising (a) a glycidyl polyether of a polyhydric compound selected from the group consisting of a polyhydric phenols and polyhydric alcohols, said glycidyl polyether having an epoxy equivalency greater than 1, (b) from 0.5 to 10 weight percent based on the glycidyl polyether of a $BF_3$-organic base complex, said $BF_3$ complex being an addition product of boron trifluoride with a compound selected from the group consisting of aromatic and aliphatic amines, amides, ethers and phenols, having only hydrocarbon substituents in addition to their amino, amido, ether and phenolic hydroxyl groups, and (c) 1 to 3 weight percent based on the glycidyl polyether of a triaryl phosphite free of other reactive groups.

2. The composition of claim 1 wherein the glycidyl polyether is a diglycidyl polyether of a dihydric phenol, said polyether having an epxoide equivalent of less than 1000, wherein the $BF_3$ complex is a $VF_3$-amine complex and wherein the triaryl phosphite is triphenyl phosphite.

3. In the process for curing (a) a glycidyl polyether of a polyhydric compound selected from the group consisting of polyhydric phenols and polyhydric alcohols, said glycidyl polyether having an epoxy equivalency greater than 1, with (b) from 0.5 to 10 weight percent based on the glycidyl polyether of a $BF_3$-amine complex, said $BF_3$ complex being an addition product of boron trifluoride with a compound selected from the group consisting of aromatic and aliphatic amines, amides, ethers and phenols, having only hydrocarbon substituents in addition to their phenolic hydroxyl, amino, amido, and ether groups, the improvement for enhancing heat distortion temperatures of resulting cured compositions which comprises incorporating into the glycidyl polyether-$BF_3$ complex composition, prior to effecting said curing, from 1 to 3 weight percent of triphenyl phosphite.

4. A cured composition resulting from the process of claim 3.

5. The process for curing a glycidyl polyether of a polyhydric phenol having at least two glycidyl ether groups per mole of said polyether which process comprises curing said polyether with a curing mixture consisting of a triphenyl phosphite and a $BF_3$-amine complex.

References Cited

UNITED STATES PATENTS

| | | | |
|---|---|---|---|
| 2,686,771 | 8/1954 | Whitehill et al. | 260—47 |
| 2,847,343 | 8/1958 | Kohn | 260—47 |
| 2,892,808 | 6/1959 | Shafer | 260—47 XR |
| 2,894,923 | 7/1959 | Graham | 260—47 XR |

WILLIAM H. SHORT, *Primary Examiner.*

JOSEPH L. SCHOFER, M. STERMAN, P. MANGAN, L. P. QUAST, *Examiners.*

T. D. KERWIN, B. J. BUTTERMARK, A. LIBERMAN, *Assistant Examiners.*